United States Patent
Chen et al.

(10) Patent No.: US 7,723,857 B2
(45) Date of Patent: May 25, 2010

(54) TURBO GENERATOR AND FUEL CELL SYSTEM HAVING THE SAME

(75) Inventors: Seung-bae Chen, Changwon-si (KR); Jin-tae Kim, Changwon-si (KR); Jae-youl Her, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 985 days.

(21) Appl. No.: 11/170,494

(22) Filed: Jun. 29, 2005

(65) Prior Publication Data

US 2006/0024178 A1 Feb. 2, 2006

(30) Foreign Application Priority Data

Jul. 30, 2004 (KR) .................. 10-2004-0060280

(51) Int. Cl.
*F02B 63/04* (2006.01)
*H02K 9/00* (2006.01)

(52) U.S. Cl. ........................... 290/1 A; 310/58
(58) Field of Classification Search ............... 290/1 B, 290/52, 1 A; 310/58; 60/801
See application file for complete search history.

(56) References Cited

U.S. PATENT DOCUMENTS

| | | | |
|---|---|---|---|
| 2,508,397 A * | 5/1950 | Kane ........................ 290/2 |
| 5,113,670 A * | 5/1992 | McAuliffe et al. ........... 62/402 |
| 5,482,791 A | 1/1996 | Shingai et al. |
| 5,497,615 A * | 3/1996 | Noe et al. ................. 60/39.511 |
| 5,964,663 A * | 10/1999 | Stewart et al. ................ 464/98 |
| 5,994,804 A * | 11/1999 | Grennan et al. ........... 310/60 R |
| 6,011,331 A * | 1/2000 | Gierer et al. ................... 310/58 |
| 6,023,135 A * | 2/2000 | Gilbreth et al. ............. 318/140 |
| 6,198,174 B1 | 3/2001 | Nims et al. |
| 6,307,278 B1 | 10/2001 | Nims et al. |
| 6,571,563 B2 * | 6/2003 | Yim et al. ..................... 60/796 |
| 2003/0102730 A1* | 6/2003 | Balas ........................... 310/58 |
| 2003/0170518 A1 | 9/2003 | Clawson et al. |

FOREIGN PATENT DOCUMENTS

DE  35 00 069 A1  8/1986
JP  2003-328772 A  11/2003

* cited by examiner

*Primary Examiner*—Michael Cuff
*Assistant Examiner*—Gerald L Sung
(74) *Attorney, Agent, or Firm*—Drinker Biddle & Reath LLP (57) ABSTRACT

Provided are a turbo generator and a fuel cell system having the same. The turbo generator includes a housing; an air inlet formed on the same axis as the axis of the housing on a first side of the housing; a rotor, a stator winding unit, impeller, and a turbine wheel mounted in the housing; and a tie-shaft installed to pass through the impeller and the turbine wheel and rotatably and integrally support the rotor.

8 Claims, 6 Drawing Sheets

TURBO GENERATOR AND FUEL CELL SYSTEM HAVING THE SAME

CROSS-REFERENCE TO RELATED PATENT APPLICATIONS

This patent application claims the priority of Korean Patent Application No. 10-2004-0060280, filed on Jul. 30, 2004, in the Korean Intellectual Property Office, the disclosure of which is incorporated herein in its entirety by reference.

FIELD OF THE INVENTION

This invention pertains to a turbo generator and a fuel cell system having the same, and more particularly, to a turbo generator system in which a stator winding unit and a bearing unit can be cooled without an additional cooling system and a fuel cell having the turbo generator system.

BACKGROUND OF THE INVENTION

Generally, a turbo generator includes a compressor, a gas turbine, and a motor generator coupled on the same axis. The compressor and the motor-generator are powered by the gas turbine via combustion gases obtained by burning a fuel with compressed air. More specifically, combustion occurs when the compressed air is supplied to a combustor at the same time when the fuel is sprayed into the combustor, and a turbine is rotated according to the high temperature and high pressure gases generated by the combustion. Then, compressed air and electricity are obtained by the rotation of the compressor and the motor-generator mounted on the same axis of the gas turbine. This kind of turbo generator can be applied to a small generator or to a fuel cell system coupled with a fuel cell.

Conventional turbo generators have several drawbacks in relation with the cooling structure of the motor-generator. The motor-generator requires a cooling structure since the motor-generator is heated by heat generated when: an air current is conducted to the motor-generator through the stator winding unit; the bearings rotate; and from the gas turbine and the compressor adjacent to the motor-generator. In a conventional turbo generator, a desired level of cooling can be achieved since external air can cool a surface of the motor-generator by disposing the air inlet close to the motor-generator and by forming an additional flow channel through which a coolant can flow. These cooling systems, however, not only complicate the overall structure of the device, they also result in low cooling efficiency.

BRIEF SUMMARY OF THE INVENTION

The present invention is directed to a turbo generator that can be cooled effectively without an additional cooling system. Additionally, the invention involves a turbo generator that has a minimum loss of inlet air at an air inlet of a compressor. Furthermore, the invention also provides a fuel cell system that includes the turbo generator.

According to an aspect of the present invention, there is provided a turbo generator comprising: a housing; an air inlet located on a first side of the housing, the air inlet coaxially aligned with the axis of the housing; a rotor, a stator winding unit, impeller, and a turbine wheel mounted in the housing; and a tie-shaft installed to pass through the impeller and the turbine wheel and rotatably and integrally support the rotor.

According to another aspect of the present invention, the fuel cell system comprises: a turbo generator including a housing, an air inlet coaxially formed with the center axis of the housing at a side thereof, a rotor and a stator winding unit serving as a motor-generator, an impeller serving as a compressor, and a turbine wheel serving as a gas turbine, and a tie shaft for rotatably supporting the rotor, the stator winding unit, the impeller and the turbine wheel, wherein the tie shaft is born by a first and a second bearing disposed at a first end of the tie shaft spaced apart from the impeller and at a location close to the impeller, respectively, a thrust disc coupled to the first end of the tie-shaft, and a first and a second thrust bearing respectively disposed in front and rear of the thrust disc; a fuel cell to which compressed air is supplied from the compressor; a combustor for generating high temperature and high pressure combustion gas by burning a fuel supplied from a fuel supplier and heated air in the fuel cell; a battery for being charged by a current generated from the motor-generator or for supplying a current charged to the motor-generator; a start signal applying unit that applies a start signal for supplying a current to the motor-generator from the battery; a switch unit for converting a current direction between the battery and the motor-generator; a control unit for controlling the operation of converting a current direction of the switch unit; and a sensor unit for transmitting an operation state of the turbo generator to the control unit by detecting the operation state of the turbo generator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
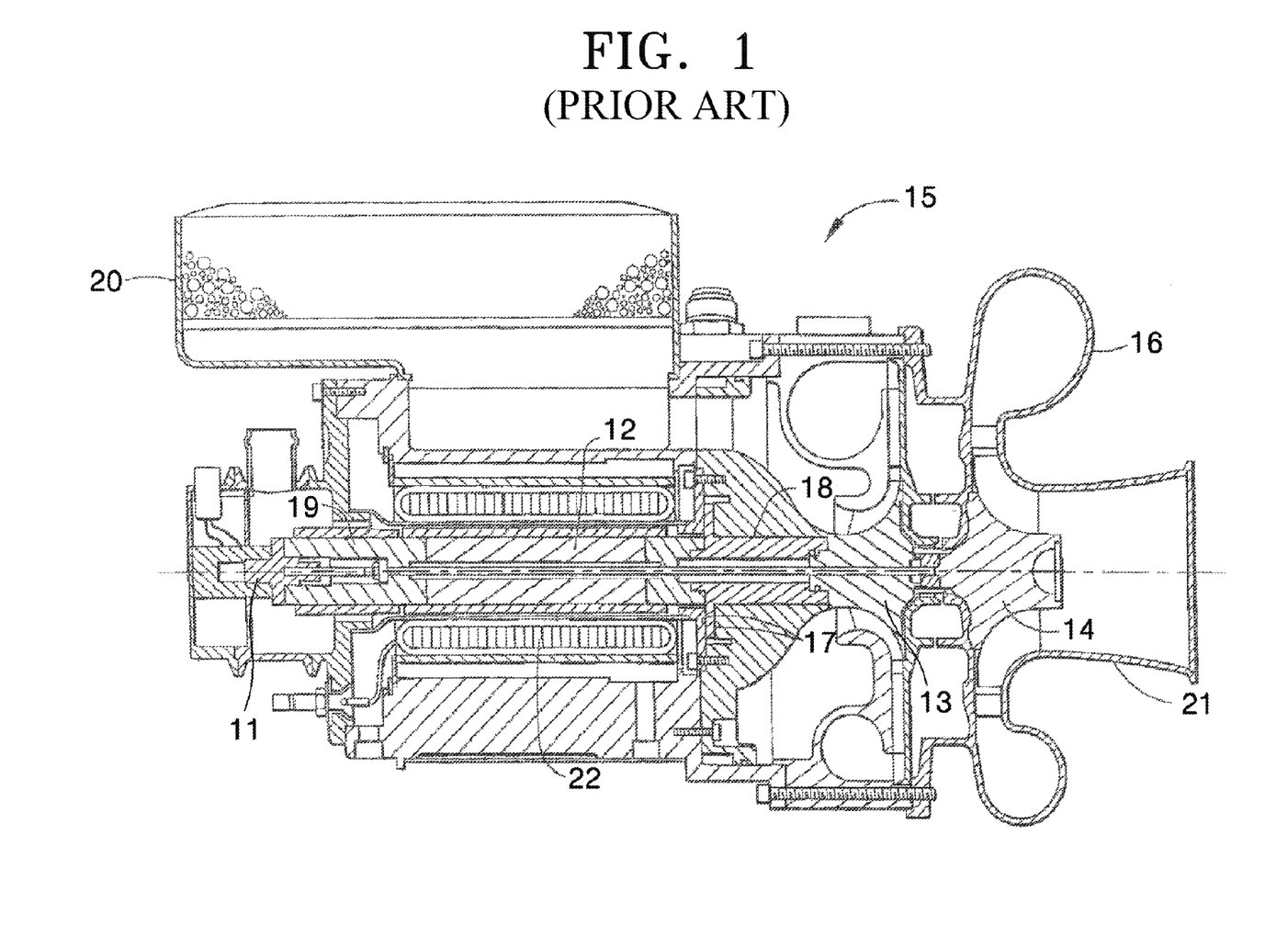
FIG. 1 is a cross-sectional view illustrating a conventional turbo generator.

FIG. 1 is a cross-sectional view illustrating a conventional turbo generator which is disclosed in U.S. Pat. No. 6,198,174.

Referring to FIG. 1, a rotor 12 of a motor-generator, impeller 13 of a compressor, and a turbine wheel 14 of a gas turbine are coupled on the same axis. The rotor 12 is a permanent magnet, and a stator winding unit 22 is mounted around the rotor 12. An induced electromotive force can be generated by the stator winding unit 22 when the rotor 12 rotates. A scroll 15 of the compressor is formed on an outer circumference of the impeller 13, and air entered through an air inlet 20 is discharged through the scroll 15 after being compressed by the impeller 13. The compressed air discharged through the scroll 15 is supplied to a combustor (not shown) together with a fuel to be burnt.

A turbine scroll 16 of the gas turbine is formed on an outer circumference of the turbine wheel 14. High-temperature and high-pressure combustion gas generated from the combustion of the fuel in the combustor (not shown) enters into the turbine scroll 16, and the turbine wheel 14 is rotated by the operation of the combustion gas. The rotation of the turbine wheel 14 rotates the impeller 13 and the rotor 12 via a tie-shaft 11. The expanded combustion gas in the turbine scroll 16 is discharged through a discharge diffuser 21.

In the turbo generator depicted in FIG. 1, air foil bearings 17 and 18 mounted on a middle portion of the tie-shaft close to the impeller 13 and another air foil bearing 19 mounted on the other end of the tie-shaft 11 allow the tie-shaft 11 to rotate. In particular, air foil bearing 17 acts as a thrust bearing.

As seen in FIG. 1, the air inlet 20 is displaced from the center of the compressor. Accordingly, the air flow path must be changed abruptly so as to let the air coming from the air inlet 20 enter into the compressor. This results in the loss of air flow at the inlet. On the other hand, since the thrust bearing 17 is disposed in close proximity to the impeller 13, the direction of the air flowing into the inlet of the impeller 13 is abruptly changed, thereby resulting in an increase of the loss of air flow at the inlet.

Figure 2:
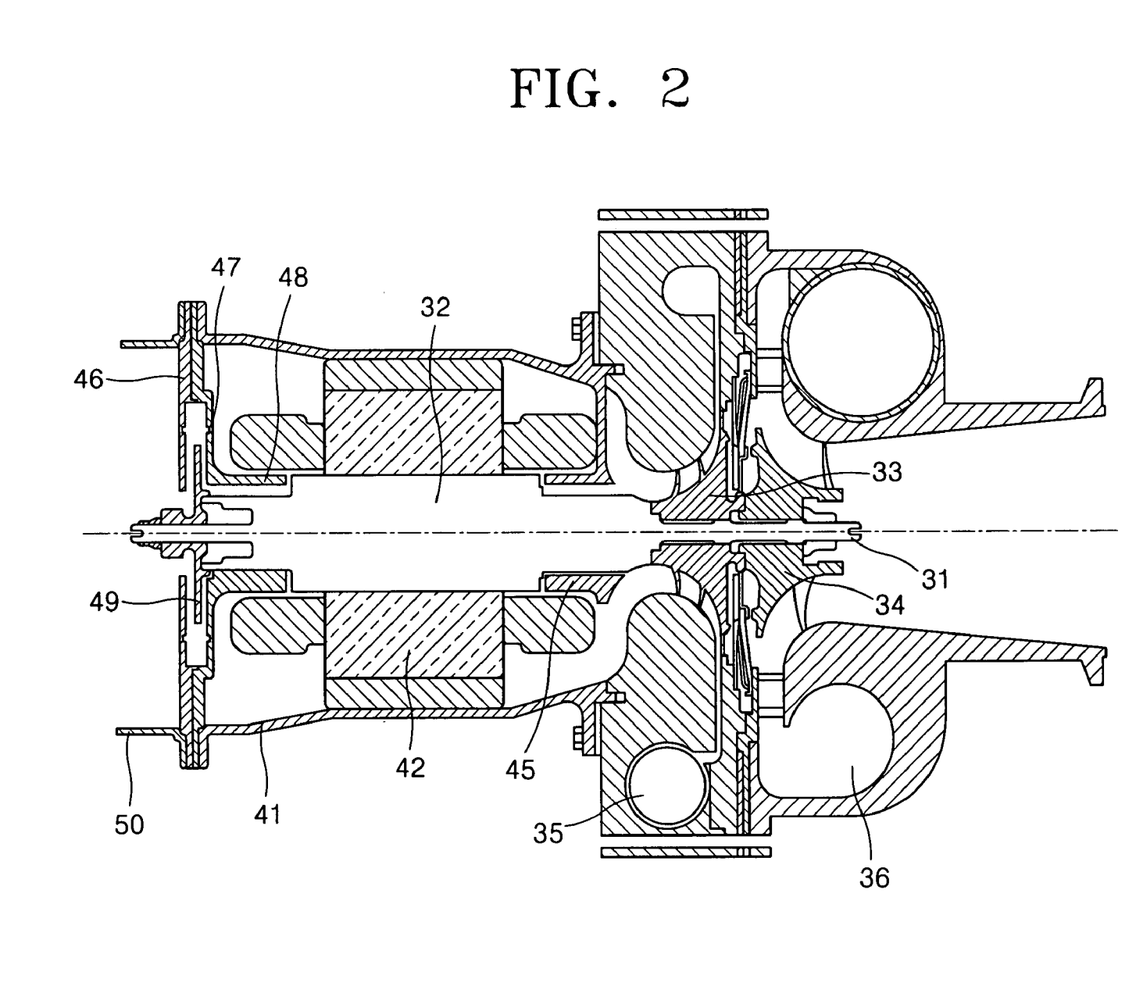
FIG. 2 is a cross-sectional view illustrating a turbo generator according to an embodiment of the present invention.
Figure 3:
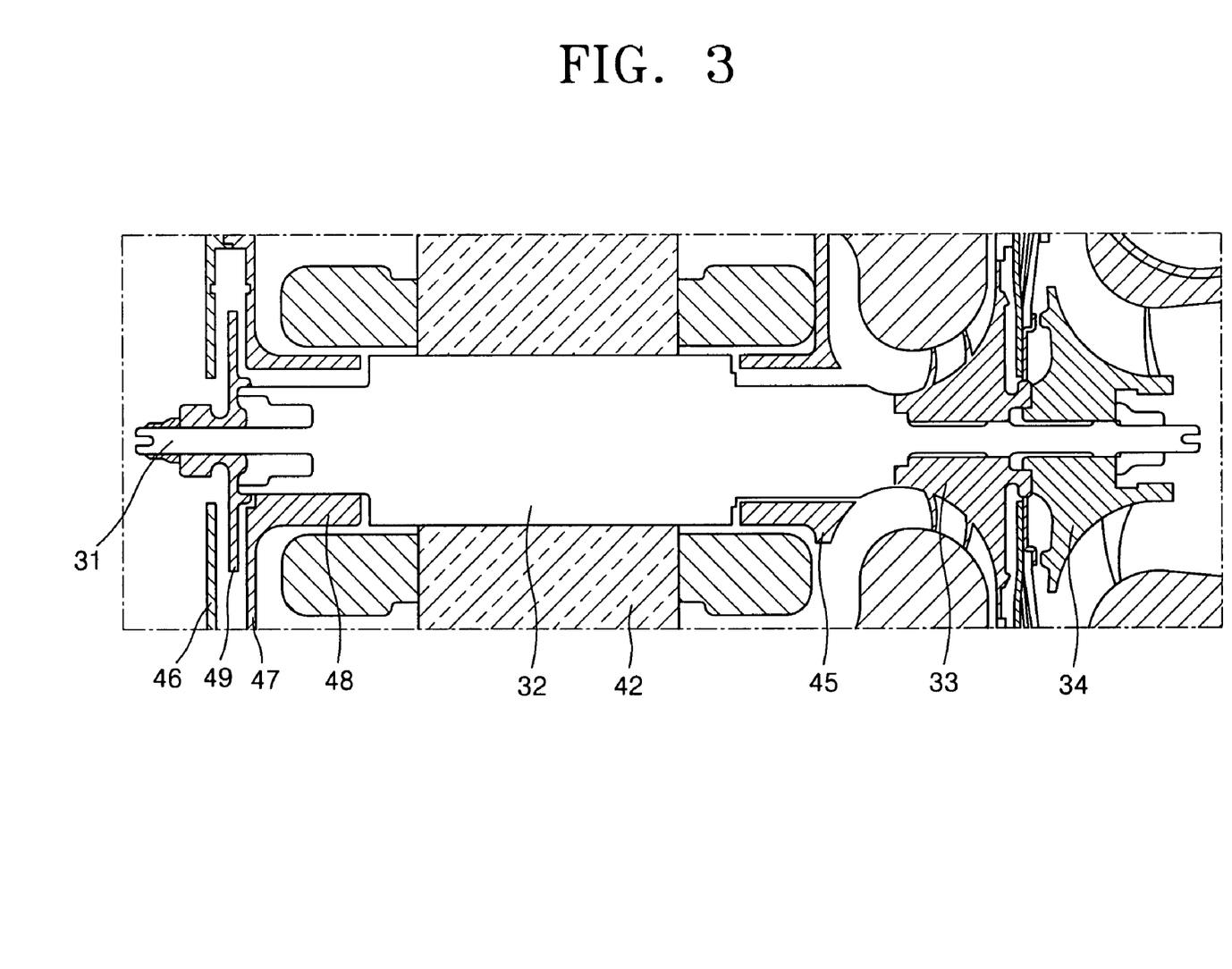
FIG. 3 is a partially enlarged cross-sectional view in a longitudinal direction of the turbo generator of FIG. 2.

FIG. 2 is a cross-sectional view illustrating a turbo generator according to an embodiment of the present invention, and FIG. 3 is a partial magnified cross-sectional view in a length direction of the turbo generator of FIG. 2

Referring to FIG. 2, a turbo generator is shown comprised of: a housing 41; an air inlet 50 mounted on a first side of the housing, coaxially with the axis of the housing 41; a compressor scroll 35 mounted extending to the housing 41 on a second side of the housing 41; a turbine scroll 36 mounted proximal to the compressor scroll 35; a tie-shaft 31 mounted to be able to rotate by extending via the housing 41, the compressor scroll 35, and the turbine scroll 36, a rotor 32 coupled to the tie-shaft 31 in the housing 41, impeller 33 mounted on the tie-shaft 31 corresponding to the compressor scroll 35, a turbine wheel 34 coupled to the tie-shaft 31 corresponding to the turbine scroll 36, and a stator winding unit 42 mounted in an inner side of the housing 41 corresponding to the rotor 32. Conventionally, the rotor 32 is composed of a permanent magnet, and is integrally formed with the tie-shaft 31. Dynamic stability can be obtained during rotation since the rotor 32 is formed integrally with the tie-shaft 31.

The stator winding unit 42 is formed by winding conductive coils. The stator winding unit 42 can act as a generator since current flows in the conductive coils when the rotor 32 rotates inside the stator winding unit 42 by the rotation force of the turbine wheel 34. On the contrary, the stator winding unit 42 can act as a motor that can rotate the rotor 32 when an external current is applied to the stator winding unit 42. Therefore, the turbo generator can be started by rotating the impeller 33 and the turbine wheel 34 by the rotation of the rotor 32.

The air inlet 50 mounted on the same axis as the housing 41 on a first side of the housing 41 is a feature of the present invention. Air entering into the housing 41 through the air inlet 50 can cool the heat generated from the stator winding unit 42 and the bearings 45 through 48 without an additional cooling device.

Air entering through the housing 41 can flow straight to the impeller 33 without an abrupt change of flow channel since the axis of the housing 41 and the axis of the impeller 33 are aligned, thereby reducing the loss of inlet air flow at the air inlet 50.

Referring to FIG. 3, the turbo generator includes a first radial bearing 48 that rotatably supports the tie-shaft 31 at a first end part of the tie-shaft 31 and a second radial bearing 45 that rotatably supports the tie-shaft 31 at a location close to the impeller 33. The first and second bearings 45 and 48 are preferably air foil bearings. As depicted in FIG. 3, the tie-shaft 31 is substantially integrally formed with the rotor 32. Accordingly, both ends of the tie-shaft 31 have a diameter less than a diameter of the tie-shaft 31 proximal to the rotor 32 and the diameter of the tie-shaft 31 gradually increases toward the rotor 32. Therefore, the first and second radial bearings 45 and 48 are disposed corresponding to the increased portion of the diameter of the tie-shaft 31 so that they can rotatably maintain the tie shaft 31.

Also, the turbo generator comprises a thrust disc 49 coupled to a first end part of the tie-shaft 31, a first thrust bearing 46 disposed in front of the thrust disc 49, and a second thrust bearing 47 disposed on a rear of the thrust disc 49. The first thrust bearing 46 is mounted by fixing an outer edge of the first thrust bearing 46 on an inner surface of the housing 41. The second thrust bearing 47 is preferably integrally formed with the first radial bearing 48. An outer edge of the second thrust bearing 47 is also fixed on an inner surface of the housing 41. The first radial bearing 48 and the second thrust bearing 47 can be air foil bearings.

The configuration in which the thrust disc 49 and the first thrust bearings 46 and 47 are disposed close to the first end part of the tie-shaft 31 is also an aspect of the present invention. That is, the thrust disc 49 and the first thrust bearings 46 and 47 are disposed on a location separated from the impeller 33. In this manner, the abrupt change in the path of the air flow can be prevented and the cooling efficiency of the thrust bearings 46 and 47 can be increased by lower temperature air entering from the air inlet 50.

Figure 4:
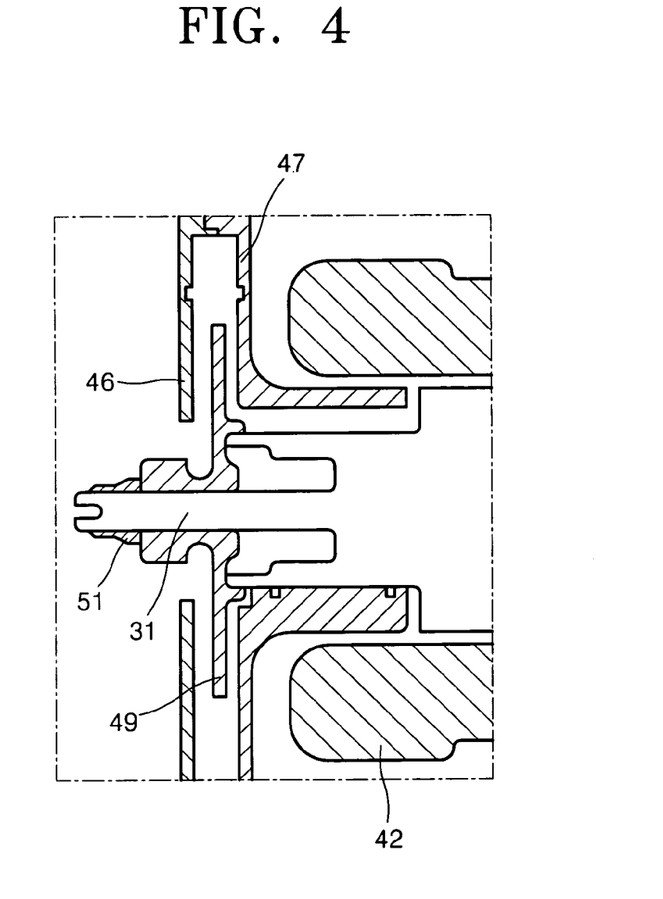
FIG. 4 is an enlarged cross-sectional view illustrating a coupled state of a thrust disc and bearings at the front part of the tie-shaft.
Figure 5:
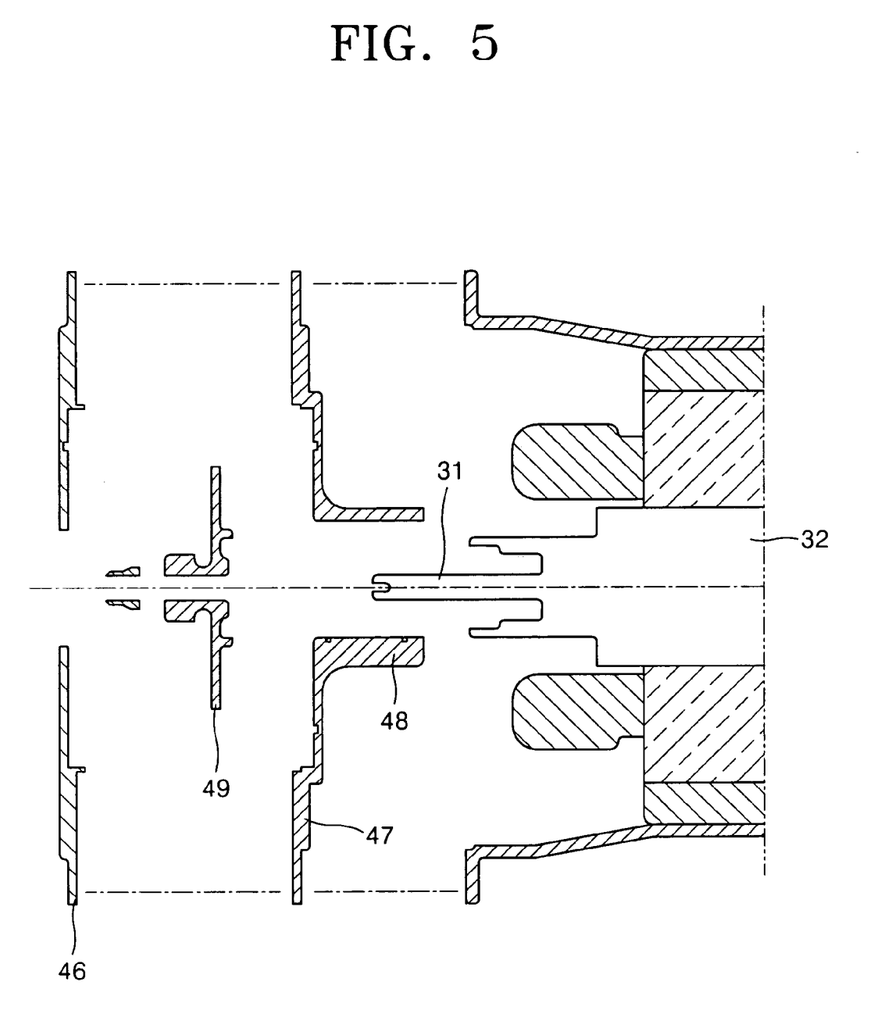
FIG. 5 is a cross-sectional view illustrating a disassembled state of a thrust disc and bearings.

FIG. 4 is an enlarged cross-sectional view illustrating a coupled state of the thrust disc and bearings at a first end of the tie-shaft, and FIG. 5 is a cross-sectional view illustrating a disassembled state of the thrust disc and bearings.

Referring to FIG. 4, the thrust disc 49 is coupled to the first end of the tie-shaft 31, by a coupling unit 51. The thrust disc 49 can maintain an axial thrust, which is transmitted in two opposing directions via the tie-shaft 31, through the first thrust bearing 46 and the second thrust bearing 47. The individual structure of each of the bearings and the thrust disc can be understood by referring to the cross-sectional view of FIG. 5.

The operation of the turbo generator will now be described with reference to FIG. 2.

Referring to FIG. 2, external air can enter into the housing 41 through the air inlet 50 mounted on the first side of the housing 41. At this time, an air filter (not shown) can be mounted in front of the air inlet 50 so as to filter the air.

Air that enters into the housing 41 has a relatively low temperature. Therefore, the air can cool the bearings 46 and 47 while moving toward the compressor scroll 35 mounted on the side of the housing 41 opposite the air inlet 50. That is, the air that entered into the housing 41 can cool the first thrust bearing 46, the second thrust bearing 47, and the first radial bearing 48 at first, and then, can cool the second radial bearing 45 mounted proximal to the impeller 33.

The air enters into the compressor scroll 35 in a compressed state after being compressed by the impeller 33. The compressed air can be supplied to other external components through a path connected to the compressor scroll 35. In the case of the turbo generator disclosed in U.S. Pat. No. 6,198, 174, heat exchange is achieved between a high temperature exhaust gas discharged from the gas turbine and the high pressure air compressed by a compressor. In the present invention, the compressed air will be used as air for operating a fuel cell (not shown), which will be described in detail later.

The compressed air is used for burning a fuel in a combustor (not shown) after being used for heat exchange or a reaction in a fuel cell, and the high temperature and high pressure gases generated as the result of combustion enter the turbine scroll 36 of the gas turbine. The combustion gases that entered into the turbine scroll 36 rotate the turbine wheel 34 and are exhausted to the outside through a diffuser 38.

Figure 6:
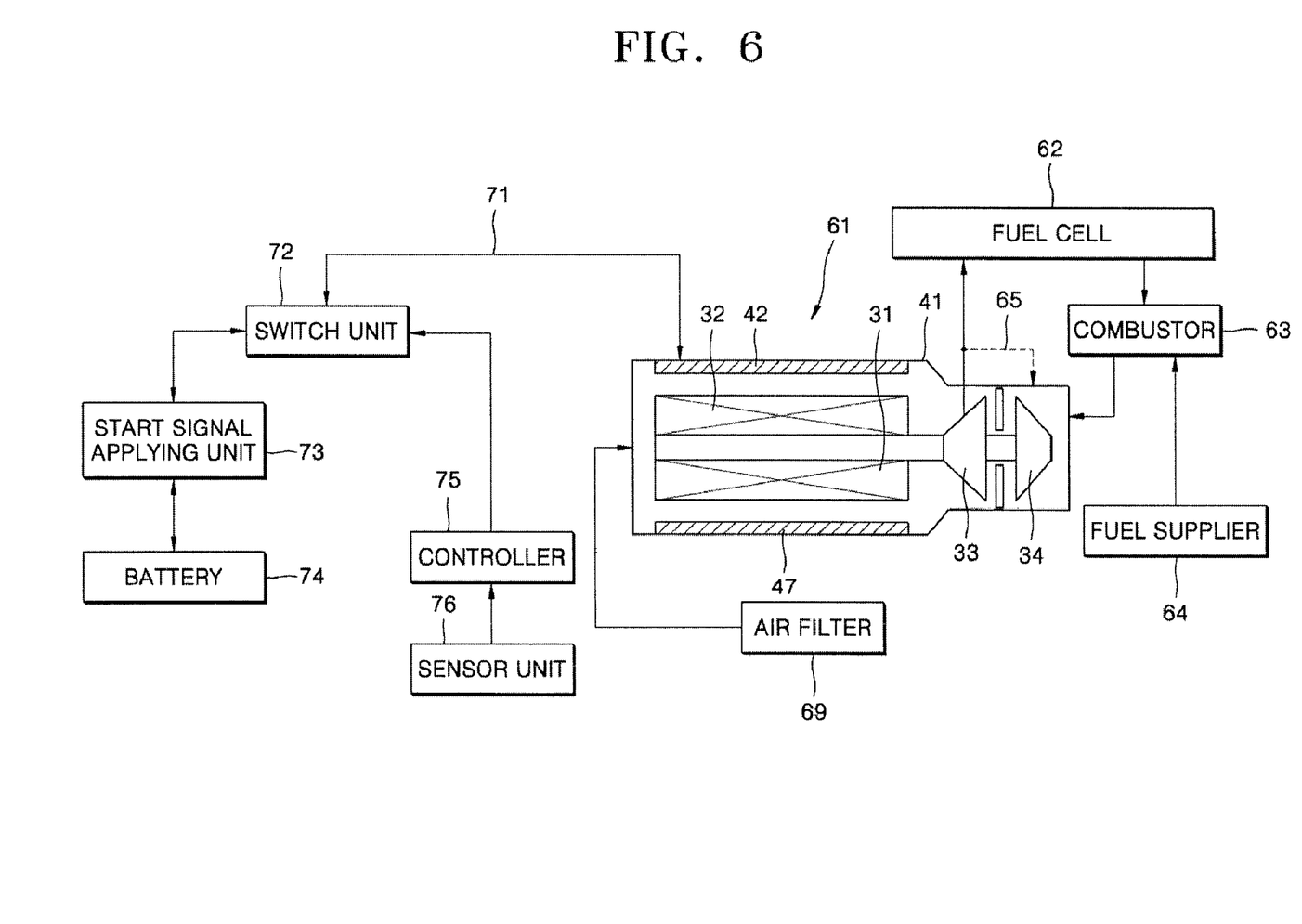
FIG. 6 is a block diagram of a fuel cell system having the turbo generator according to the present invention.

FIG. 6 is a block diagram of a fuel cell system having the turbo generator of the present invention. Referring to FIG. 6, the fuel cell system having the turbo generator according to the present invention comprises: a turbo generator 61 including a rotor 32 and a stator winding unit 42 serving as a motor-generator; an impeller serving as a compressor; and a turbine wheel 34 serving as a gas turbine, all of which are rotatably and coaxially supported along a tie shaft 31 in a housing 41 formed with an air inlet; an air filter 69 disposed to supply filtered air to the air inlet of the housing 41; a fuel cell 62 to which compressed air is supplied from the compressor; a combustor 63 to which air heated in the fuel cell 62 is supplied; a fuel supplier 64 that supplies fuel to the combustor 63 to discharge high pressure and high temperature gas into the gas turbine; a battery 74 for being charged by a current generated from the motor-generator or for supplying a current charged to the motor-generator; a start signal applying unit 73 that applies a start signal for supplying a current to the motor-generator from the battery 74; a switch unit 72 for converting a current direction between the battery 74 and the motor-generator; a control unit 75 for controlling the operation of converting a current direction of the switch unit 72; and a sensor 76 for transmitting an operation state of the turbo generator 61 to the control unit 75 by detecting the operation state of the turbo generator 61.

Air filtered by the air filter 69 is supplied to the compressor through the housing 41, heated in the fuel cell 62, burnt in the combustor 63 together with a fuel, supplied to the gas turbine and discharged to the outside after rotating the turbine wheel 34, sequentially.

As is well known in the art, the fuel cell 62 is a device to obtain heat and electricity at the same time using methanol as a fuel or to obtain electricity from a chemical reaction between oxygen and hydrogen. This is because the oxidation and reduction reactions in the fuel cell are exothermic reactions, and the compressed air supplied from the compressor can be heated by the heat generated from the exothermic reactions. As a result of this process, the compressed air is discharged as a high temperature and high pressure operation fluid. However, even though the operation fluid discharged from the fuel cell 63 is in a state of high temperature and pressure, the state of the operation fluid is not enough to drive the gas turbine 34. Therefore, the high temperature and high pressure of the operation fluid are further increased in the combustor 63 by burning a fuel supplied from the fuel supplier 64.

The combustion gas generated by burning a fuel in the combustor 63 enters the gas turbine and rotates the turbine wheel 34. The rotation of the turbine wheel 34 rotates the impeller 33 of the compressor and the rotor 32 of the motor-generator via the tie-shaft 31. Then, electricity is generated from the motor-generator. A current can be applied in a direction to charge the battery 74 according to the operation of the switching unit 72.

Reference numeral 65, as shown in FIG. 6, indicates that a portion of the compressed air is used as cooling air by supplying it to the gas turbine. That is, a portion of air compressed by the impeller 33 in the compressor can be used for cooling heat generated from the gas turbine by supplying it to the gas turbine. For this purpose, an air circulation device for circulating cooling air, such as an air jacket, can be included in the gas turbine.

In the fuel cell system according to the present invention, as described above, the air inlet is also disposed on a side of the housing 41 of the turbo generator 61. Accordingly, air entering into the compressor of the turbo generator 61 is supplied through the housing 41. This allows for the stator winding unit 42 included in the motor-generator and the bearings that support the tie-shaft 31 to be effectively cooled.

As depicted in FIG. 2, in the fuel cell system according to the present invention, cooling effect with respect to the thrust disc 49, the first thrust bearing 46, the second thrust bearing 47 is improved since they are disposed proximal to the air inlet 50, and the loss of air flow from the inlet to the compressor having the impeller 33 can be minimized.

A turbo generator according to the present invention and a fuel cell system having the same can effectively cool the motor-generator and the thrust bearings without additional cooling systems. Also, the loss of inlet air entering the compressor can be minimized. The overall structure of the system is simplified, thereby enabling miniaturization and integration.

While the present invention has been particularly shown and described with reference to exemplary embodiments thereof, it will be understood by those of ordinary skill in the art that various changes in form and details may be made therein without departing from the spirit and scope of the present invention as defined by the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A turbo generator comprising:
    a housing;
    a tie-shaft positioned within the housing and extending therethrough;
    at least one bearing configured so as to support the tie-shaft;

the tie-shaft in mechanical communication with a rotor and passing entirely through each of a stator winding unit, an impeller, and a turbine wheel mounted within the housing;

an air inlet located on a first side of the housing, the air inlet coaxially aligned with a center axis of the housing, the center axis of the housing being coaxial to the tie-shaft and also extending along the entire length of the tie-shaft, the air inlet being configured so that air entering the housing through the air inlet is directed in a single straight airflow path from the air inlet along the center axis into the impeller; and effectively cools the stator winding unit and the at least one bearing without the need for an additional cooling device.

2. The turbo generator of claim 1 further comprising:
the tie-shaft having a first end and a second end;
a first radial bearing located proximal to the first end;
a second radial bearing proximal to the impeller and distal from the first end;
a thrust disc coupled to the first end of the tie-shaft, the thrust disc having a first side and a second side; and
a first and second thrust bearing disposed with respect to the first and second side of the thrust disc, respectively.

3. The turbo generator of claim 1, wherein air entering from the air inlet directly contacts the stator winding unit, the first and second radial bearings, and the first and second thrust bearings.

4. The turbo generator of claim 1, wherein the rotor is a permanent magnet integrally formed with the tie-shaft so that the rotor and the tie-shaft are together a single, unitary element.

5. A turbo generator comprising:
a housing;
means for connecting, and passing entirely through each of, a rotor, a stator winding unit, an impeller, and a turbine wheel within the housing; at one bearing configured so as to support the means for connecting; and
means for directing air into the housing so as to effectively cool the stator winding unit and the at least one bearing without the need for an additional cooling device,
wherein the means for directing air into the housing is located on a first side of the housing, the means for directing air being coaxially aligned with a center axis of the housing, the center axis of the housing being coaxial to the means for connecting and also extending along the entire length of the means for connecting so that the air entering the housing through the means for directing air into the housing is directed in a single straight airflow path from the means for directing air into the housing along the center axis into the impeller.

6. The turbo generator of claim 5, wherein the means for connecting the rotor, stator winding unit, impeller, and turbine wheel within the housing is a tie-shaft.

7. The turbo generator of claim 5, wherein the means for directing air into the housing is an air inlet.

8. The turbo generator of claim 5, wherein the rotor is integral to the means for connecting the stator winding unit, impeller, and turbine wheel within the housing so that the rotor and the means for connecting are together a single, unitary element.

* * * * *